(12) United States Patent
Henstrom

(10) Patent No.: US 6,557,095 B1
(45) Date of Patent: Apr. 29, 2003

(54) SCHEDULING OPERATIONS USING A DEPENDENCY MATRIX

(75) Inventor: Alexander Henstrom, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/472,165

(22) Filed: Dec. 27, 1999

(51) Int. Cl.[7] ............... G06F 9/30; G06F 9/52; G06F 9/38
(52) U.S. Cl. ............. 712/216; 712/219; 712/217; 712/240; 712/245; 712/207
(58) Field of Search ................ 712/206, 219, 712/216, 200, 208, 218, 215, 23, 207, 217, 240, 245; 711/146, 137, 100; 369/47.24; 710/57

(56) References Cited

U.S. PATENT DOCUMENTS

| | | | |
|---|---|---|---|
| 5,201,057 A | * 4/1993 | Uht | 712/216 |
| 5,465,336 A | * 11/1995 | Imai et al. | 712/216 |
| 5,546,597 A | 8/1996 | Martell et al. | 712/23 |
| 5,655,096 A | 8/1997 | Branigan | 712/200 |
| 5,710,902 A | 1/1998 | Sheaffer et al. | 712/216 |
| 5,721,864 A | * 2/1998 | Chiarot et al. | 711/137 |
| 5,737,758 A | 4/1998 | Merchant | 711/146 |
| 5,737,759 A | 4/1998 | Merchant | 369/47.24 |
| 5,796,975 A | 8/1998 | Lesartre et al. | 712/218 |
| 5,850,533 A | 12/1998 | Panwar et al. | 712/216 |
| 5,884,059 A | 3/1999 | Favor et al. | 712/215 |
| 5,904,732 A | * 5/1999 | Greenley et al. | 710/57 |
| 5,911,058 A | * 6/1999 | Ogawa | 712/219 |
| 5,913,925 A | 6/1999 | Kahle et al. | 712/206 |
| 5,923,862 A | 7/1999 | Nguyen et al. | 712/208 |
| 6,016,540 A | 1/2000 | Zaidi et al. | 712/217 |
| 6,216,200 B1 | 4/2001 | Yeager | 711/100 |

* cited by examiner

Primary Examiner—Daniel H. Pan
(74) Attorney, Agent, or Firm—Kenyon & Kenyon

(57) ABSTRACT

A method and apparatus for scheduling jump and store operations using a dependency matrix and for scheduling operations in-order using a dependency matrix. A child operation, such as a jump or store micro-operation, is received for scheduling. The child operation is dependent on the completion of a parent operation, such as when all jump operations in an instruction stream must be executed in-order. An entry corresponding to the child operation is placed in a scheduling queue and the child operation is compared with other entries in the scheduling queue. The result of this comparison is stored in a dependency matrix. Each row in the dependency matrix corresponds to an entry in the scheduling queue, and each column corresponds to a dependency on an entry in the scheduling queue. Entries in the scheduling queue can then be scheduled based on the information in the dependency matrix, such as when the entire row associated with an entry is clear.

36 Claims, 15 Drawing Sheets

| Queue | Valid | Destination |
|---|---|---|
| 0 | | |
| 1 | V | 11 |
| 2 | V | 14 |
| 3 | | |
| 4 | V | 12 |
| 5 | V | 15 |
| 6 | | |
| 7 | V | 21 |

610 points to Valid column; arrows point to queue 0 (D1=17) and queue 6 (D2=19).

| | 0 | 1 | 2 | 3 | 4 | 5 | 6 | 7 |
|---|---|---|---|---|---|---|---|---|
| | x | | | | | | | |
| | | x | | | | | D | |
| | | | x | D | | | | | (620)
| | | | | x | | | | |
| | | | | | x | | D | |
| | | | D | | D | x | | |
| | | | | | | | x | |
| | | | | | | | | x | ← READY, DISPATCH

FIG. 6B (T=1)

| Queue | Valid | Destination |
|---|---|---|
| 0 | V | 17 |
| 1 | V | 11 |
| 2 | V | 14 |
| 3 | | |
| 4 | V | 12 |
| 5 | V | 15 |
| 6 | V | 19 |
| 7 | | |

| | 0 | 1 | 2 | 3 | 4 | 5 | 6 | 7 |
|---|---|---|---|---|---|---|---|---|
| | x | D | | | | | | |
| | | x | | | | | | | ← READY, DISPATCH
| | | | x | | D | | | |
| | | | | x | | | | |
| | | | | | x | | | | ← READY, DISPATCH
| | | | | D | | D | x | |
| | | | | D | | D | | x |
| | | | | | | | | x |

FIG. 6C (T=2)

| Queue | Valid | Destination |
|---|---|---|
| 0 | V | 17 |
| 1 | | |
| 2 | V | 14 |
| 3 | | |
| 4 | | |
| 5 | V | 15 |
| 6 | V | 19 |
| 7 | | |

| | 0 | 1 | 2 | 3 | 4 | 5 | 6 | 7 |
|---|---|---|---|---|---|---|---|---|
| | x | | | | | | | | ← READY, DISPATCH
| | | x | | | | | | |
| | | | x | | | | | | ← READY, DISPATCH
| | | | | x | | | | |
| | | | | | x | | | |
| | | | | D | | x | | |
| | | | | D | | | x | |
| | | | | | | | | x |

1000

| 0 | | |
|---|---|---|
| 1 | | |
| 2 | V | first uop |
| 3 | | |
| 4 | V | third uop |
| 5 | V | second uop |
| 6 | | |
| 7 | V | fourth uop |

Valid    uop

1011

| | 0 | 1 | 2 | 3 | 4 | 5 | 6 | 7 |
|---|---|---|---|---|---|---|---|---|
| | x | | | | | | | |
| | | x | | | | | | |
| | | | x | | | | | |
| | | | | x | | | | |
| | | | | D | x | D | | |
| | | | | D | | x | | |
| | | | | | | | x | |
| | | | | D | | D | D | x |

FIG. 10A
T = 0

| 0 | V | fifth uop |
|---|---|---|
| 1 | | |
| 2 | | |
| 3 | | |
| 4 | V | third uop |
| 5 | V | second uop |
| 6 | | |
| 7 | V | fourth uop |

Valid    uop

| | 0 | 1 | 2 | 3 | 4 | 5 | 6 | 7 |
|---|---|---|---|---|---|---|---|---|
| | x | | | | D | D | | D |
| | | x | | | | | | |
| | | | x | | | | | |
| | | | | x | | | | |
| | | | | | x | D | | |
| | | | | | | x | | |
| | | | | | | | x | |
| | | | | | D | D | | x |

| 0 | V | fifth uop | 1 |
| --- | --- | --- | --- |
| 1 |   |   |   |
| 2 | V | first uop | 0 |
| 3 |   |   |   |
| 4 | V | third uop | 0 |
| 5 | V | second uop | 1 |
| 6 |   |   |   |
| 7 | V | fourth uop | 0 |

Valid    uop    thread

1122

|   | 0 | 1 | 2 | 3 | 4 | 5 | 6 | 7 |
| --- | --- | --- | --- | --- | --- | --- | --- | --- |
|   | x |   |   |   |   | D |   |   |
|   |   | x |   |   |   |   |   |   |
|   |   |   | x |   |   |   |   |   |
|   |   |   |   | x |   |   |   |   |
|   |   |   | D |   | x |   |   |   |
|   |   |   |   |   |   | x |   |   |
|   |   |   |   |   |   |   | x |   |
|   |   |   | D |   | D |   |   | x |

FIG. 11A
T = 0

| 0 | V | fifth uop | 1 |
| --- | --- | --- | --- |
| 1 |   |   |   |
| 2 |   |   |   |
| 3 | V | sixth uop | 1 |
| 4 | V | third uop | 0 |
| 5 |   |   |   |
| 6 |   |   |   |
| 7 | V | fourth uop | 0 |

Valid    uop    thread

|   | 0 | 1 | 2 | 3 | 4 | 5 | 6 | 7 |
| --- | --- | --- | --- | --- | --- | --- | --- | --- |
|   | x |   |   |   |   |   |   |   |
|   |   | x |   |   |   |   |   |   |
|   |   |   | x |   |   |   |   |   |
|   | D |   |   | x |   |   |   |   |
|   |   |   |   |   | x |   |   |   |
|   |   |   |   |   |   | x |   |   |
|   |   |   |   |   |   |   | x |   |
|   |   |   |   |   | D |   |   | x |

| | Valid | destination | jump |
|---|---|---|---|
| 0 | | | |
| 1 | V | 11 | |
| 2 | V | 14 | |
| 3 | V | | 1 |
| 4 | V | 12 | |
| 5 | | | |
| 6 | | | |
| 7 | V | 21 | |

1222

|   | 0 | 1 | 2 | 3 | 4 | 5 | 6 | 7 |
|---|---|---|---|---|---|---|---|---|
| 0 | x | | | | | | | |
| 1 | | x | | | | | | D |
| 2 | | | x | | D | | | |
| 3 | | | | x | | | | |
| 4 | | | | | x | | | D |
| 5 | | | | | | x | | |
| 6 | | | | | | | x | |
| 7 | | | | | | | | x |

FIG. 12A
T = 0

| | Valid | destination | jump |
|---|---|---|---|
| 0 | V | | 1 |
| 1 | V | 11 | |
| 2 | V | 14 | |
| 3 | V | | 1 |
| 4 | V | 12 | |
| 5 | | | |
| 6 | | | |
| 7 | | | |

|   | 0 | 1 | 2 | 3 | 4 | 5 | 6 | 7 |
|---|---|---|---|---|---|---|---|---|
| 0 | x | | | D | | | | |
| 1 | | x | | | | | | D |
| 2 | | | x | | D | | | |
| 3 | | | | x | | | | |
| 4 | | | | | x | | | D |
| 5 | | | | | | x | | |
| 6 | | | | | | | x | |
| 7 | | | | | | | | x |

| 0 | | | |
|---|---|---|---|
| 1 | V | 11 | |
| 2 | V | 14 | |
| 3 | | | |
| 4 | V | 12 | |
| 5 | | | |
| 6 | V | | 1 |
| 7 | | | |

Valid   destination   jump

1222

| | 0 | 1 | 2 | 3 | 4 | 5 | 6 | 7 |
|---|---|---|---|---|---|---|---|---|
| | x | | | | | | | |
| | | x | | | | | | D |
| | | | x | | D | | | |
| | | | | x | | | | |
| | | | | | x | | | D |
| | | | | | | x | | |
| | | | | | | | x | |
| | | | | | | | | x |

| 0 | | | |
|---|---|---|---|
| 1 | | | |
| 2 | V | 14 | |
| 3 | V | | 1 |
| 4 | V | 12 | |
| 5 | V | | 1 |
| 6 | | | |
| 7 | | | |

Valid  destination  store

1305

| | 0 | 1 | 2 | 3 | 4 | 5 | 6 | 7 |
|---|---|---|---|---|---|---|---|---|
| | x | | | | | | | |
| | | x | | | | | | |
| | | | x | | D | | | |
| | | | | x | D | | | |
| | | | | | x | | | |
| | | | | | | x | | |
| | | | | | | | x | |
| | | | | | | | | x |

FIG. 13A
T = 0

| 0 | | | |
|---|---|---|---|
| 1 | V | | |
| 2 | V | 14 | |
| 3 | V | | 1 |
| 4 | V | 12 | |
| 5 | | | |
| 6 | V | | 1 |
| 7 | | | |

Valid  destination  store

| | 0 | 1 | 2 | 3 | 4 | 5 | 6 | 7 |
|---|---|---|---|---|---|---|---|---|
| | x | | | | | | | |
| | | x | | D | | D | | |
| | | | x | | D | | | |
| | | | | x | | | | |
| | | | | | x | | | |
| | | | | | | x | | |
| | | | | | | | x | |
| | | | | | | | | x |

| 0 | V | | |
|---|---|---|---|
| 1 | V | | |
| 2 | V | 14 | |
| 3 | | | |
| 4 | V | 12 | |
| 5 | | | |
| 6 | | | |
| 7 | | | |

Valid destination store

1305

| | 0 | 1 | 2 | 3 | 4 | 5 | 6 | 7 |
|---|---|---|---|---|---|---|---|---|
| | x | | | | | | | |
| | | x | | | | | | |
| | | | x | | D | | | |
| | | | | x | | | | |
| | | | | | x | | | |
| | | | | | | x | | |
| | | | | | | | x | |
| | | | | | | | | x |

FIG. 13C
T = 3

SCHEDULING OPERATIONS USING A DEPENDENCY MATRIX

FIELD

The present invention relates to the scheduling of operations in a processor. More particularly, the present invention relates to a method and apparatus for scheduling operations using a dependency matrix.

BACKGROUND

A primary function of a processor is to perform a stream of operations, such as a stream of computer instructions. Some processors are designed to completely perform one operation in the stream before beginning to perform the next operation. With these "in-order" processors, the result of one operation is correctly used by later operations that "depend" on it. Consider the following instructions:

Load memory-1→register-X
Add register-X register-Y→register-Z.

The first instruction loads the content of memory-1 into register-X. The second instruction adds the content of register-X to the content of register-Y and stores the result in register-Z. The second instruction is a "child" operation that depends on the first instruction, or "parent" operation. If the result of the first instruction is not stored in register-X before the second instruction is executed, an incorrect result will be stored in register-Z. Note that a single operation may have more than one parent, more than one child, and may be both a parent and a child with respect to different operations.

To improve a processor's performance, operations can be performed "out-of-order." For example, if data for one instruction in a stream is not ready at a particular time, the processor may execute another instruction later in the stream. In this case, a "scheduler" can schedule instructions so that a child instruction will not be performed before its parent instruction. This improves processor performance because the processor does not remain idle until the first instruction's data is ready.

Computer instructions are not the only operations that have such dependencies. For example, memory operations may be scheduled so that information is stored into a memory location before information is read from that memory location by a later operation. Other examples include scheduling operations based on limited execution resources, memory resources, register resources, slot availability or bus availability. By way of example, the scheduling of micro-operations, also known as "μops" or "uops," will be used herein to describe known scheduling techniques.

FIG. 1 is an overview of a known system for processing instructions and uops. The system includes an instruction fetch and decode engine 110 that decodes an instruction stream into a series of in-order ops that represent the data flow of the instruction stream. The instructions can be decoded, for example, into uops with two logical sources and one logical destination. The uops are "issued" from the instruction fetch and decode engine 110 to a renaming and allocation unit 120. If a processor has only a limited number of physical registers, the renaming and allocation unit 120 maps logical register references to physical register references.

The uops are then sent to a scheduler 130, which stores several pending uops and selects from this group, or "queue," the uop or uops that will be performed next. The scheduler 130 selects uops such that a child uop will not be performed before its parent uop. That is, the scheduler 130 decides if every source register used by a uop is ready to be used. If all of the uop's sources are ready, and if execution resources are available, the uop is sent, or "dispatched," to a execution resource 140 where the operation is performed. Thus, uops are dispatched based on data flow constraints and resource availability, not the original ordering of the stream.

Known schedulers are typically based on the "Tomasulo" scheduler. FIG. 2, a block diagram of such a Tomasulo scheduler, shows two issued uops, Add1 and Add2, that have been received by a scheduler 200. Each uop has two sources and a destination. Add1 sums the contents of register 1 (r1) with the contents of r2. The result is stored in r3. Add2-sums the contents of r3 with the contents of r2 and stores the result in r4. As can be seen, Add2 depends on, and is the child of, Add1. The scheduler 200 includes a ten-bit scoreboard 210 that is used to keep track of which registers are ready. Each bit represents a register, and, for example, a "0" indicates that the register is not ready while a "1" indicates that the register is ready. If Add1 has not been executed, the bit associated with r3 in the scoreboard 210 is set to "0," indicating that r3 is not ready.

An active scheduler 220 uses the scoreboard 210 to determine if a uop is ready for dispatch. For example, the active 220 scheduler looks at the bits associated with r3 and r2 when considering Add2. If the scoreboard 210 reflects that both sources are ready, the active scheduler 220 dispatches the uop for execution. If either source is not available, the uop is not dispatched. After the uop is executed, the scoreboard 210 is updated to reflect that 4 is now ready.

FIG. 3 illustrates circuitry associated with a Tomasulo scheduler. When a uop is written, or allocated, into the Tomasulo scheduler, its sources are read from the scoreboard 210. If the scoreboard 210 indicates that the sources are ready, the uop is ready to schedule. Sources that are ready in the scoreboard 210 are marked ready in the scheduler. Sources that are not ready will monitor the result bus. The value of a pending uop's source register 310 is matched against the value of completed uops on the destination, or result, bus using a group of compares 320. The outputs from the group of compares 320 are input to a wide OR 330, and the output of the wide OR is stored as a ready bit 340 for the first source. Similar logic (not shown in FIG. 3) is performed to generate a ready bit for the pending uop's second source. When all of the pending uop's sources are ready, as determined by the output of the logic gate 350, the uop is ready for dispatch. This logic is repeated for each pending uop, such as entries 1 to n. If multiple uops are ready to dispatch, priority logic 360 determines which uop will be dispatched. A lookup is performed to determine the destination register 370 of the dispatching uop, and this value is driven on a result bus.

The Tomasulo scheduler uses a "tight" scheduling loop as shown in FIG. 4. For each pending uop, the scheduler monitors the result bus and compares the destination of executed uops with the pending uop's sources at 410. Next, the scheduler performs ready determination logic 420 to determine the dispatch readiness of the pending uop. For every source used by the pending uop, the results of the comparison performed at 410 are ORed at 430. The results for each source are then ANDed at 440. Only if every source is ready does the scheduler determine that the uop is ready for dispatch.

Several uops may be ready for dispatch at one time. If more than one uop is ready, prioritization is performed at 450 to determine which of the ready uops should be dispatched first. Finally, the pending uop is dispatched at 460. When a uop is dispatched, the scheduler repeats the actions described above, resulting in the tight scheduling loop that determines when pending uops are ready for execution.

There are a number of disadvantages, however, to known scheduling techniques. For example, the basic motivation for increasing clock frequencies is to reduce instruction latency. Suppose that a part of a program contains a sequence of N instructions, $I_1, I_2, \ldots, I_N$. This part of the program may also contain any other instructions. Suppose also that each instruction requires, as an input, the result of the previous instruction. Such a program cannot be executed in less time than $T=L_1+L_2+\ldots L_N$, where $L_n$ is the latency of instruction $I_n$, even if the processor was capable of executing a very large number of instructions in parallel. Hence, the only way to execute the program faster is to reduce the latencies of the instructions.

Moreover, when each uop in a stream is dependent on the previous uop, a scheduler must perform one full iteration of the tight scheduling loop for each dispatched uop. This becomes the minimum "latency" of each uop. The latency of a uop may be defined as the time from when its input operands are ready until its result is ready to be used by another uop. Additionally, the speed of an instruction through the multi-stage system shown in FIG. 1 is limited by the speed of the slowest unit, or "weakest link," in the chain.

The speed of a processor in uops-per-second, or S, can be expressed as S=P/L, where P is the average parallelism and L is the average uop latency in seconds. A key advantage of a scheduler is that it increases the value P, which improves the processor's performance. However, an execution unit is typically able to execute a common uop, such as an add, with a latency that is less than the latency of the tight scheduling loop. Therefore, the use of the scheduler also increases the value of L, which limits the processor's performance.

For example, comparing the destination register of dispatched uops to all sources of all pending uops may take a long time, such as from 4 to 6 gate operations. This—in addition to the ready determination logic which may take 1 or 2 gates, the prioritization which may take another 1 or 2 gates and destination lookup of 2 or 3 gates—results in a tight loop that takes from 8 to 13 gate operations. Moreover, the scheduler may have to monitor a number of different result buses, which increases the amount of comparing that must be performed. The growing number of registers used in processors, as well as the increasing frequencies of processor operation, make the current system of scheduling operations impractical.

SUMMARY

In accordance with an embodiment of the present invention, a jump operation to be scheduled in a processor is received. It is determined if previous jump operations in the stream have not been dispatched for execution, and the received jump operation is scheduled after all previous jump operations in the stream have been dispatched for execution.

BRIEF DESCRIPTION OF THE DRAWINGS

FIGS. 6A to 6C illustrate the use of a dependency matrix to schedule operations according to an embodiment of the present invention.

FIGS. 10A to 10B illustrate the use of a dependency matrix to schedule operations completely in-order according to an embodiment of the present invention.

FIGS. 11A to 11B illustrate the use of a dependency matrix to schedule operations in-order on a per-thread basis according to an embodiment of the present invention.

FIGS. 12A to 12C illustrate the use of a dependency matrix to schedule jump operations in-order according to an embodiment of the present invention.

FIGS. 13A to 13C illustrate the use of a dependency matrix to schedule memory load operations after prior memory store operations according to an embodiment of the present invention.

DETAILED DESCRIPTION

Figure 5:
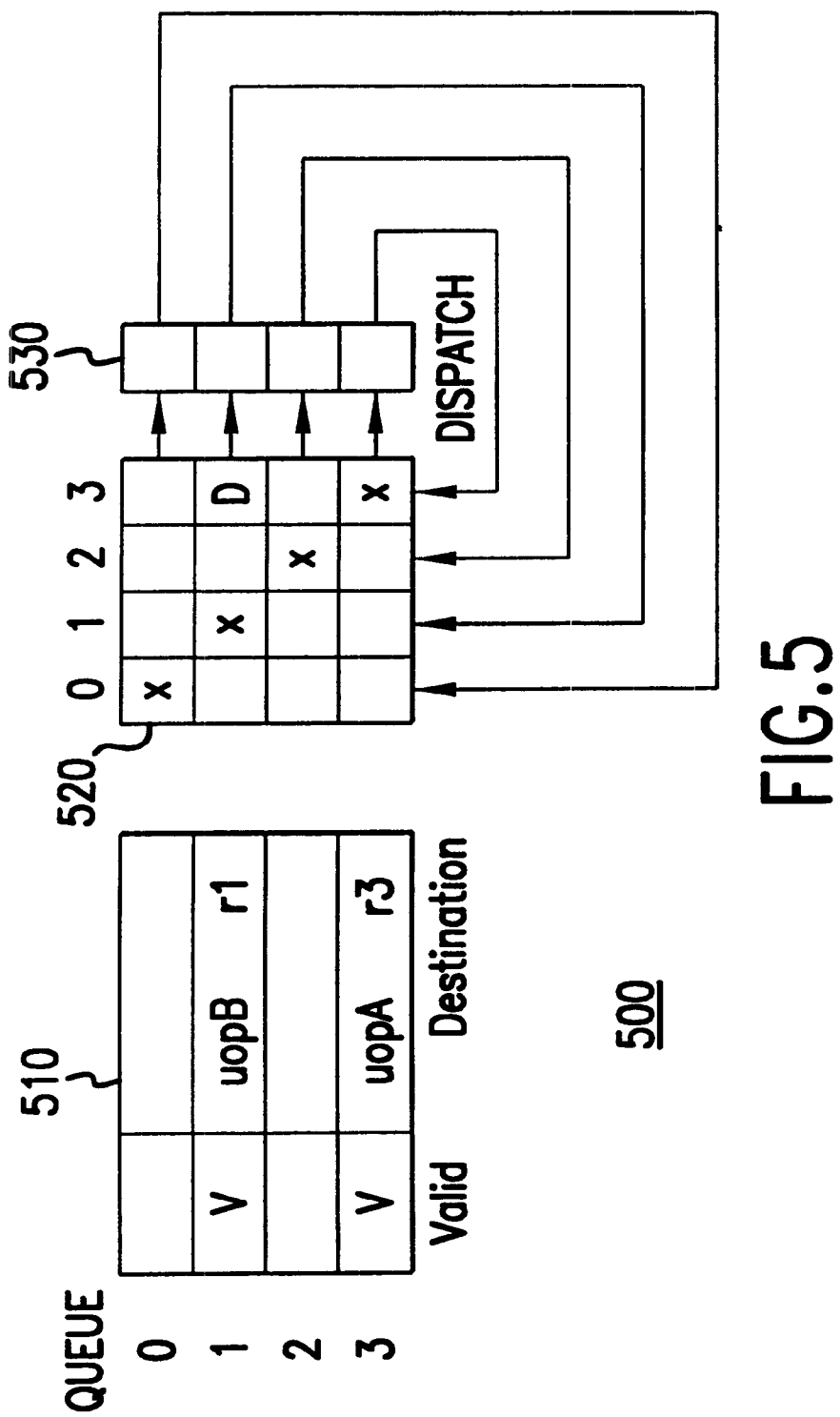
FIG. 5 shows a matrix scheduler according to an embodiment of the present invention.

An embodiment of the present invention is directed to a method and apparatus for scheduling operations using a dependency matrix. Referring now in detail to the drawings wherein like parts are designated by like reference numerals throughout, FIG. 5 shows a matrix scheduler 500 according to an embodiment of the present invention. Each uop that enters the matrix scheduler 500 is placed into a position, or entry, in a scheduling queue 510. The matrix scheduler shown in FIG. 5 has 4 such entries, labeled "0" to "3." Each entry includes a valid bit indicating whether or not there is a uop in that position. As indicated by a "V" in FIG. 5, position 1 contains uopB. It will be understood that "V" represents, for example, a bit having a value of "1." Similarly, position 3 contains uopA and positions 0 and 2 are empty. The scheduling queue 510 also includes a destination register for each entry, and the collection of destination registers is referred to as a "destination register file." As shown in FIG. 5, the result of uopB will be placed in register 1 (r1) and the result of uopA will be placed in r3.

Figure 1:
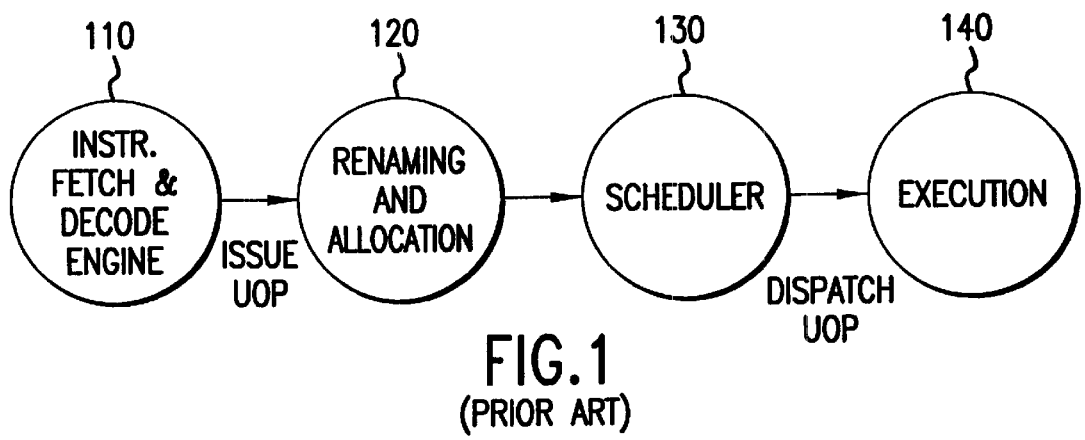
FIG. 1 is an overview of a known system for processing instructions and uops.
Figure 2:
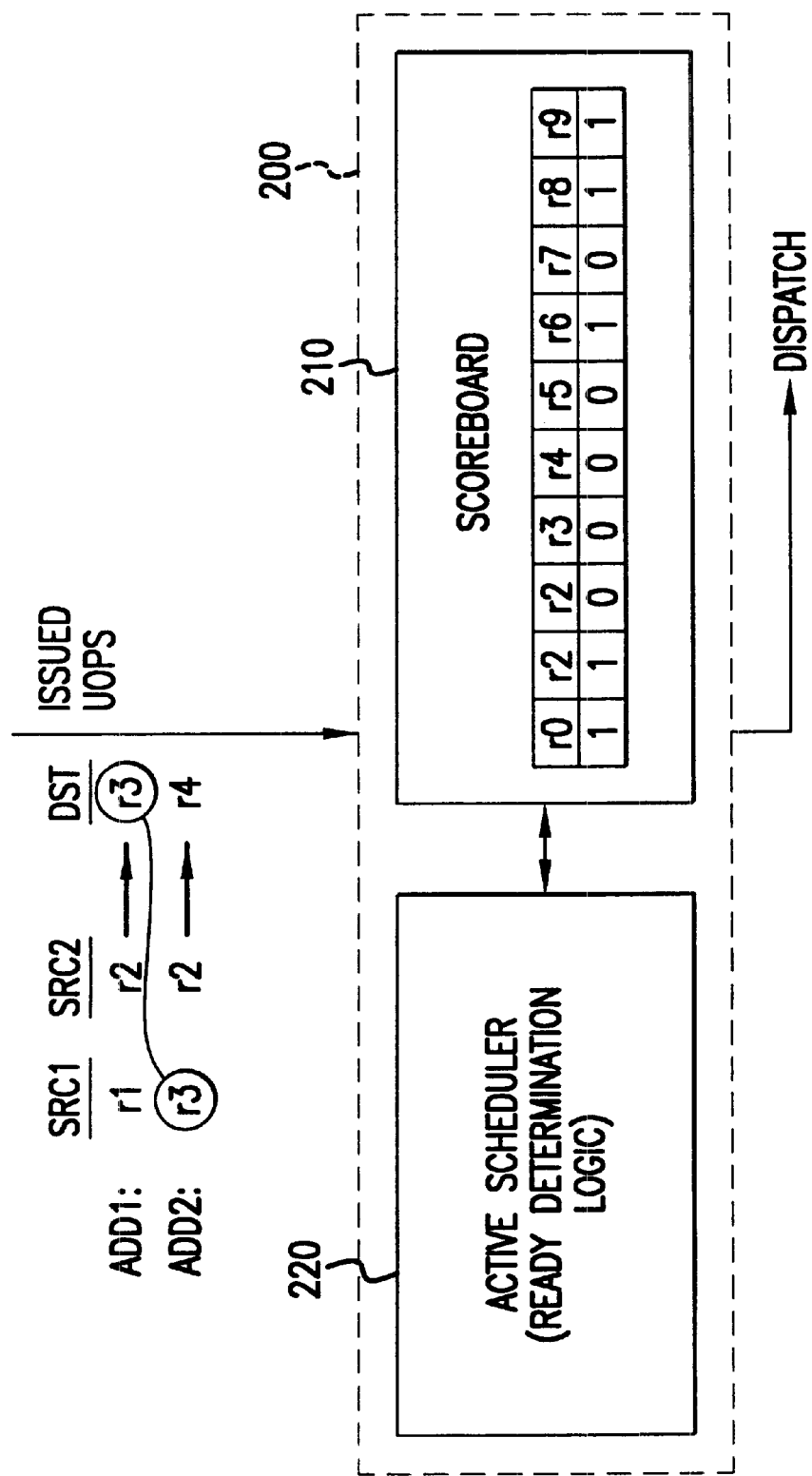
FIG. 2 is a block diagram of a known Tomasulo scheduler that schedules operations in a processor.
Figure 3:
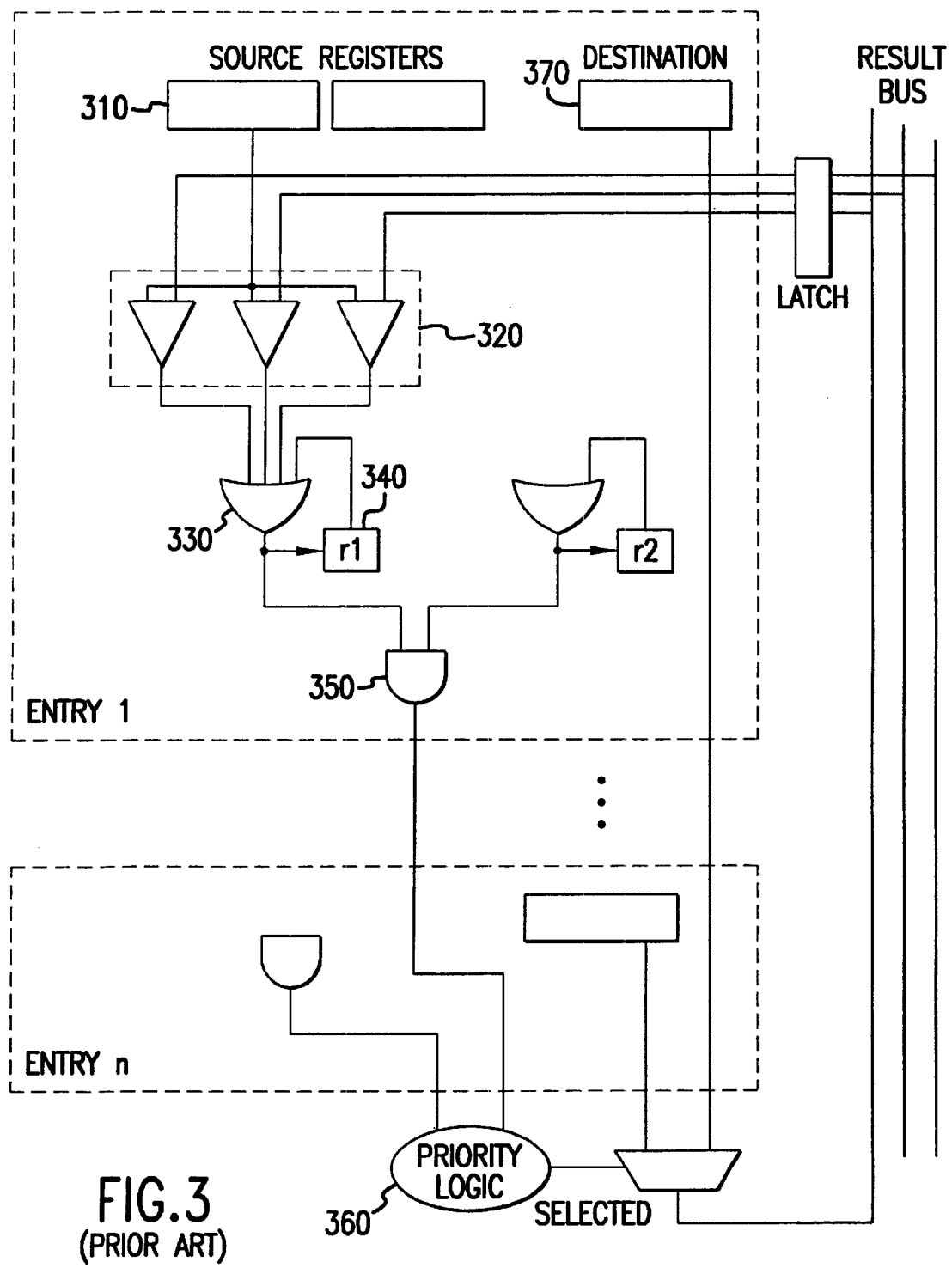
FIG. 3 illustrates circuitry associated with a Tomasulo scheduler.
Figure 4:
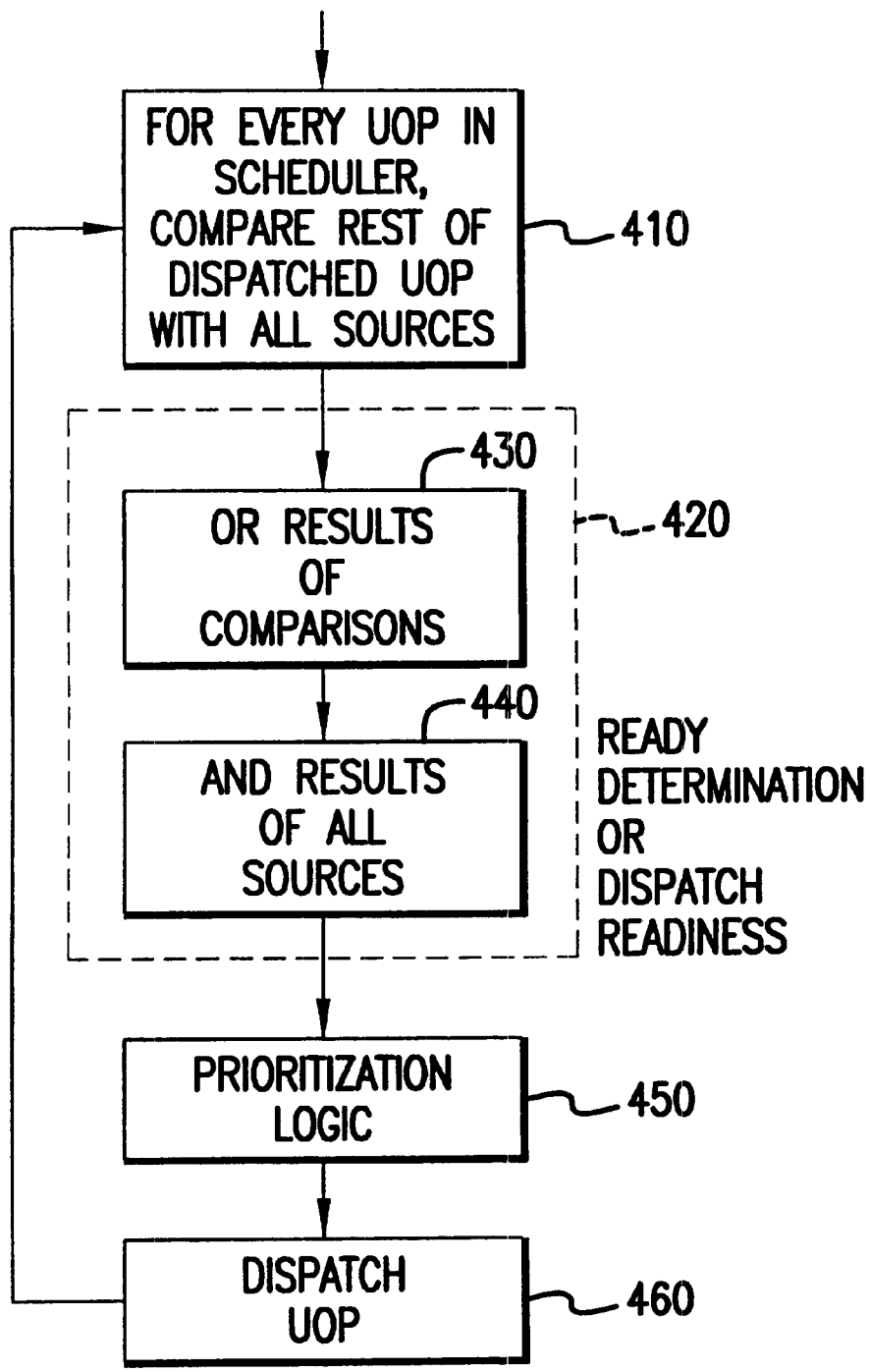
FIG. 4 is a flow diagram of a known method of scheduling operations in a processor.

The stream of entering uops is in-order, so a parent of an entering uop is either pending inside the matrix scheduler 500 or has already been dispatched. That is, a parent uop will never enter the matrix scheduler 500 after its child. If dependencies between entries in the scheduling queue 510 are easily setup and maintained, the time consuming compares in the scheduling loop, as described with respect to FIG. 4, may be eliminated. According to an embodiment of the present invention, this is done using a dependency matrix 520.

Each bit, or element, in the dependency matrix 520 corresponds to the dependency of a uop in one queue position to a uop in another queue position. For example, the "D" in row 1, column 3 indicates that the uop in entry 1, or uopB, is dependent on the result produced by the uop in entry 3, or uopA. That is, uopB uses the destination of uopA, or r3, as a source. It will be understood that "D" represents, for example, a bit having a value of "1." In another embodiment, "D" may represent a bit having a value of "0." Because a uop cannot depend on itself, each box along the diagonal of the dependency matrix 520 is marked with an "x." Note that while a dependency matrix having "rows" and "columns" with a specific relationship to dependencies is used herein as an example, other structures, such as a matrix in which the terms "rows" and "columns" are switched, may be used instead.

When a new uop enters the scheduling queue 510, allocation logic determines which available position should be used. The entering uop is then written into that position using write ports (not shown in FIG. 5), and the sources of the entering uop are matched against the destination register file using compare (CAM) ports (also not shown in FIG. 5). A match between an entering uop's source and a pending uop's destination indicates that the entering uop is dependent on the pending entry, and a "D" is stored at the appropriate position in the dependency matrix 520.

In this way, the dependency matrix 520 reflects which uops are ready to dispatch. A uop with any dependency bit set must wait for the parent associated with that bit to dispatch. As shown in FIG. 5, uopA is ready to dispatch, because there is no "D" in row 3, but uopB is not ready because it must wait for its dependency on uopA to resolve, as shown by the "D" in row 1, column 3. The dispatch status of each entry in the matrix scheduler 500, as determined by ready determination logic, may be stored as a dispatch logic bit 530. If a number of uops are ready for dispatch at one time, priority logic may be used to determine which uop will be dispatched first. Finally, deallocation logic determines which entries in the scheduling queue 510 need to be "deallocated," or which positions in the queue are now empty and ready to be used again.

When a uop dispatches, the corresponding column in the dependency matrix 520 is cleared because any bit that was set in that column corresponded to a uop that was dependent on the dispatched uop. As shown by an arrow in FIG. 5, column 3 will be cleared when uopA dispatches. This clears the "D" in row 1, column 3 and sets the stage for uopB to dispatch in the next cycle. This is the scheduling loop for the matrix scheduler 500, and it is faster than the traditional Tomasulo scheduler because the compares and destination lookup shown in FIG. 4 have both been eliminated. The ready determination logic, which merely checks to see if an entire row is clear, can be implemented as a simple wired-OR structure in domino logic. Such a circuit can be designed at very high frequencies.

FIGS. 6A to 6C illustrate how uops run through a scheduler having a dependency matrix 620 according to an embodiment of the present invention. As shown in FIG. 6A, the scheduler includes an out-of-order scheduling queue 610 with eight positions, labeled from "0" to "7," but any number of positions can be used. Each position in the scheduling queue 610 contains a validity indication and information about the uop, including the uop's destination. At time T=0 the scheduling queue 610 has five entries with a validity bit set to "V." Thus, for example, queue position 0 is empty and queue position 1 contains an entry which uses register 11 as the destination.

Each row in the dependency matrix 620 corresponds to a position in the scheduling queue 610. Each column in the dependency matrix 620 is associated with a dependency on a position in the scheduling queue 610. As before, because a uop cannot depend on itself, each box along the diagonal of the dependency matrix 620 is marked with an "x." The "D" at row 1, column 7 indicates that the uop in queue position 1 depends on the uop in queue position 7. That is, the operation in queue position 1 is the child of the operation in queue position 7. Of the five entries in the scheduling queue 610, only the entry in queue position 7 does not depend on any other entry. Thus, only the entry in queue position 7 is labeled "ready" and can be dispatched by the scheduler.

Now consider two newly issued uops that are ready to be placed in the scheduling queue 610. The first source of the first uop ($S_{11}$) is register 11 and the second source ($S_{12}$) is register 2. The destination of the first uop ($D_1$) is register 17. That is, the first uop uses registers 11 and 2 to create a value that is placed in register 17. The first source of the second uop ($S_{21}$) is register 14, the second source ($S_{22}$) is register 12 and the destination ($D_2$) is register 19. The scheduling queue 610 and dependency matrix 620 shown in FIG. 6A use, for illustration purposes, a superscalar processor that can process two uops simultaneously. In this way, two uops can be allocated into the scheduler, and two uops can be scheduled, in any one cycle. The first uop is being placed into queue position 0, although it may instead have been placed in queue position 3, for example. The second uop is being placed into queue position 6.

Referring now to FIG. 6B, at time T=1 the entry in queue position 7 has been dispatched and the position is now empty. Note that column in the dependency matrix 620 associated with queue position 7, or column 7, has also been cleared and the "D" at rows 1 and 4 have been removed. This is because any child operation that depends on the dispatched uop no longer needs to wait for that destination to become ready. Thus, each time an entry in the queue is dispatched the entire column in the matrix associated with that entry is cleared. Because column 7 has been cleared, two new entries in rows 1 and 4 are now ready for dispatch.

When a uop enters the scheduler, dependency is recorded in the form of the dependency matrix 620. Since the uop that was placed in queue position 0 has register 11 as a source, the bit in the matrix associated with queue position 1 is set to "D." This is because queue position 1 has register 11 as its destination and therefore the uop in position 0, which needs to use the value of register 11, should not be performed before the uop in position 1. The uop that was entered into queue position 0 also has register 2 as a source, but no entry in the queue has register 2 as a destination. Therefore, the value in register 2 is already valid, and no dependency is created. With respect to the uop that was entered into queue position 6, the boxes in columns 2 and 4 are flagged to note the dependency on registers 14 and 12, respectively.

Time T=2 is shown in FIG. 6C. The uops in queue positions 1 and 4 have been dispatched, and the two columns associated with those entries have been cleared. The uop that was placed in queue position 0 is therefore ready for dispatch. The uop that was placed in queue position 5 and 6, however, still depends on the entry in queue position 2, because they need to use the value in register 14 as a source.

Note that in a superscalar processor, where 2 uops can arrive at the scheduler simultaneously, care must be taken in case a parent arrives in one channel at the same time its child arrives in another channel. In this case, the entering child uop will not find its parent in the scheduling queue 610, but this information is still needed to correctly setup the dependency matrix 620. In this case, it is necessary to perform dependency checks between concurrent uops as they are placed in the dependency matrix 620. The program order guarantees that only the later uop's sources must be compared to the earlier uop's destination, so the compare does not need to be performed both ways. The result of the compare, or concurrency bit, can then be factored in when setting up the dependency matrix 620.

Figure 7:
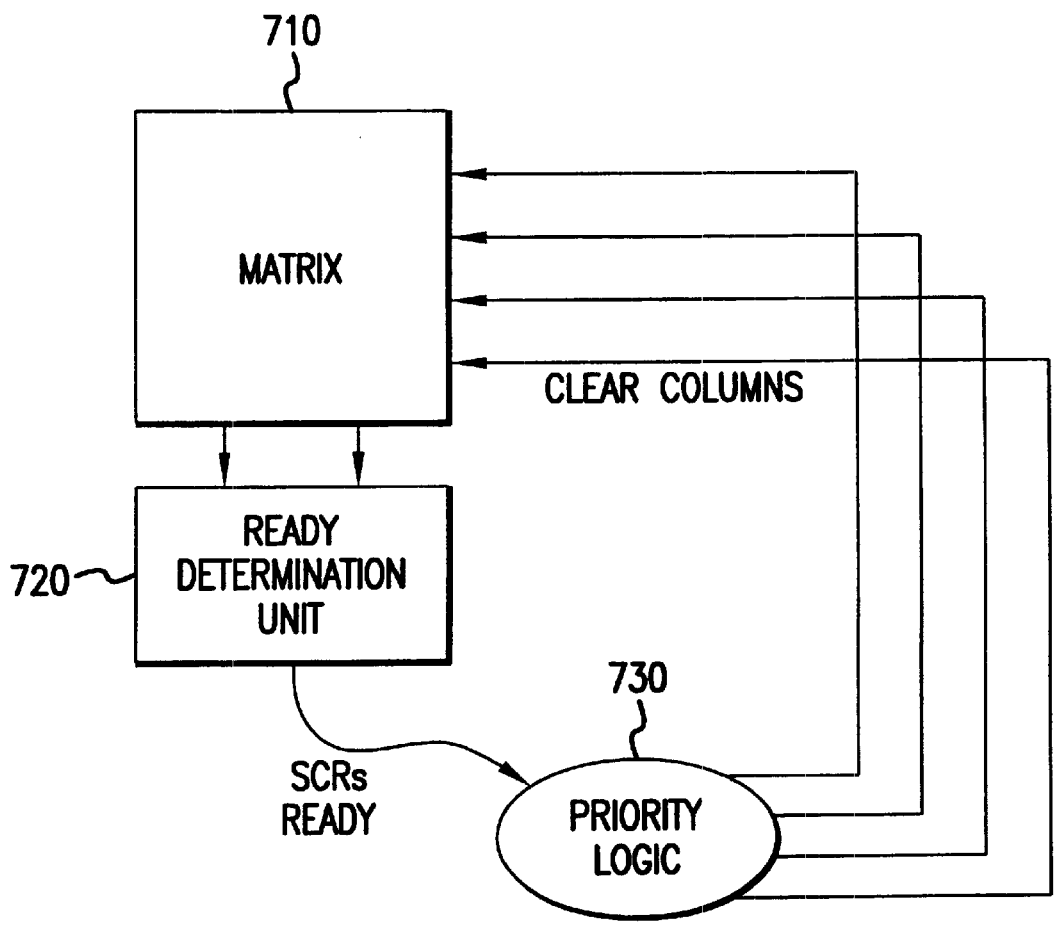
FIG. 7 is a block diagram of scheduling circuitry according to an embodiment of the present invention.

FIG. 7 is a block diagram of scheduling circuitry according to an embodiment of the present invention. The circuitry includes a dependency matrix 710 coupled to a ready determination unit 720. The ready determination unit 720 detects if all of the bits in a row are cleared. If the ready determination unit 720 detects that all of the bits in a row are cleared, the operation associated with that row is ready for dispatch. When more than a single operation is ready, priority logic 730 determines which of the ready operations should be scheduled. The dispatched operations also clear the associated column in the dependency matrix 710, because other entries no longer need to wait for the dispatched entry.

Figure 8:
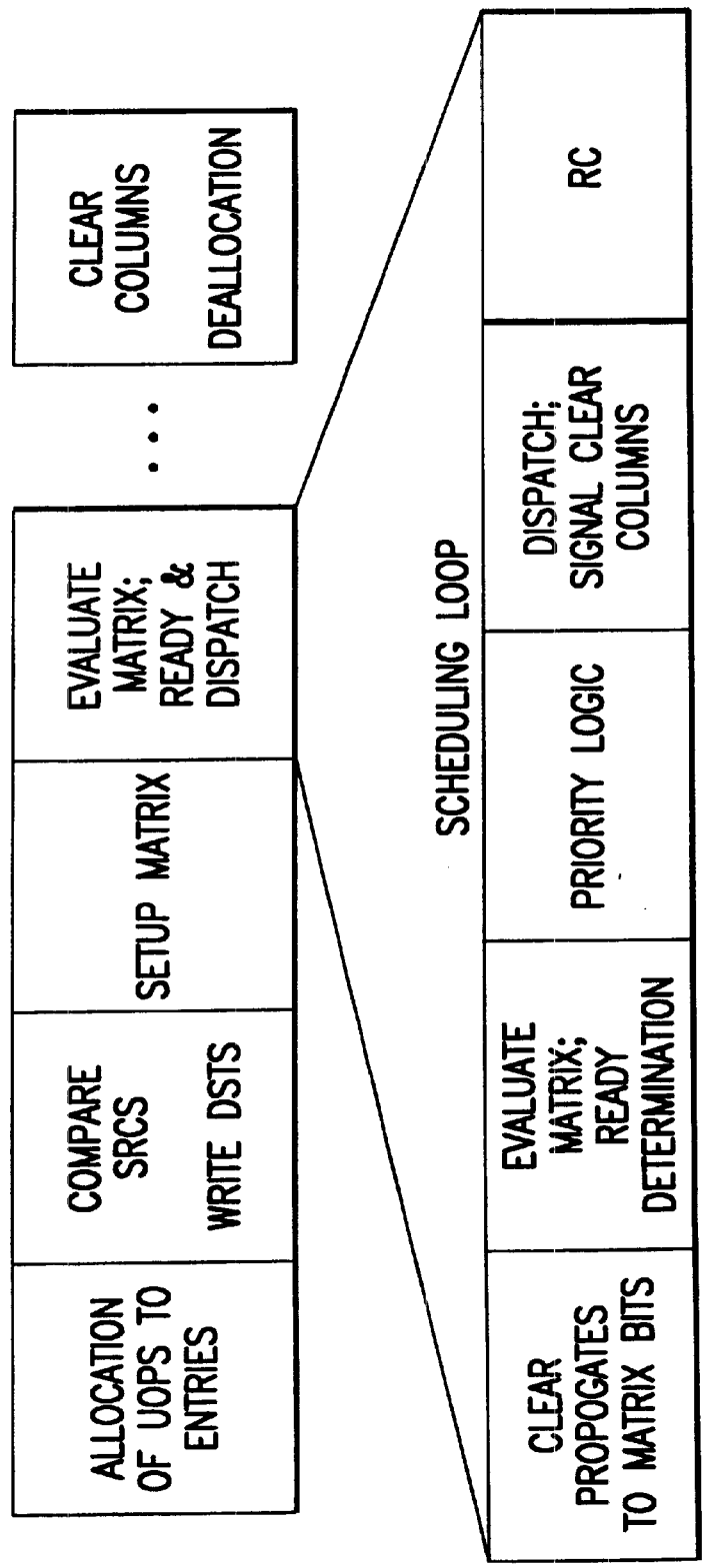
FIG. 8 illustrates a five stage pipeline for a matrix scheduler according to an embodiment of the present invention.

Referring now to FIG. 8, which illustrates a five stage pipeline for a matrix scheduler according to an embodiment of the present invention, the first stage of the pipeline allocates uops to queue positions in the scheduler. Empty slots are determined based on the deallocation of positions in the previous cycle, and it is decided how many uops can be allocated, if any. Incoming uops are assigned to free positions in the queue and appropriate write vectors are produced to be used in the next stage of the pipeline.

In the second stage of the pipeline, the sources of incoming uops are compared to the existing destination register file and the results of the compares are stored for use in the next stage. Simultaneously, the destinations are written into the allocated entries using the write vectors generated during the last stage. Since the valid bits for the newly written destinations have not been written, sources may not be compared against newly written destinations.

In the third stage of the pipeline, compare results are used to setup the matrix for the newly written entries. The valid bits are then written to enable evaluation of the matrix in the next cycle.

The fourth stage of the pipeline is the scheduling loop. Any column clears, caused by dispatched uops, are propagated to the matrix bits. Each row is then evaluated for readiness. If a uop is not ready, the evaluation will be performed again in the next cycle. If a uop is ready, it is prioritized against other ready uops for dispatch. Once the uop is ready to dispatch, a dispatch vector is sent to the register file to read the necessary information and to deallocate the entry. This also produces a signal that clears the corresponding columns in the matrix, allowing any children, or dependent uops, to prepare for dispatch in subsequent cycles.

The fifth stage of the pipeline is the deallocation of the previously dispatched entries from the scheduler. This stage also simultaneously reads necessary information from a register file to be sent to the execution units. The information may include, for example, operands, sources, destination registers, immediate values and identifiers.

Figure 9:
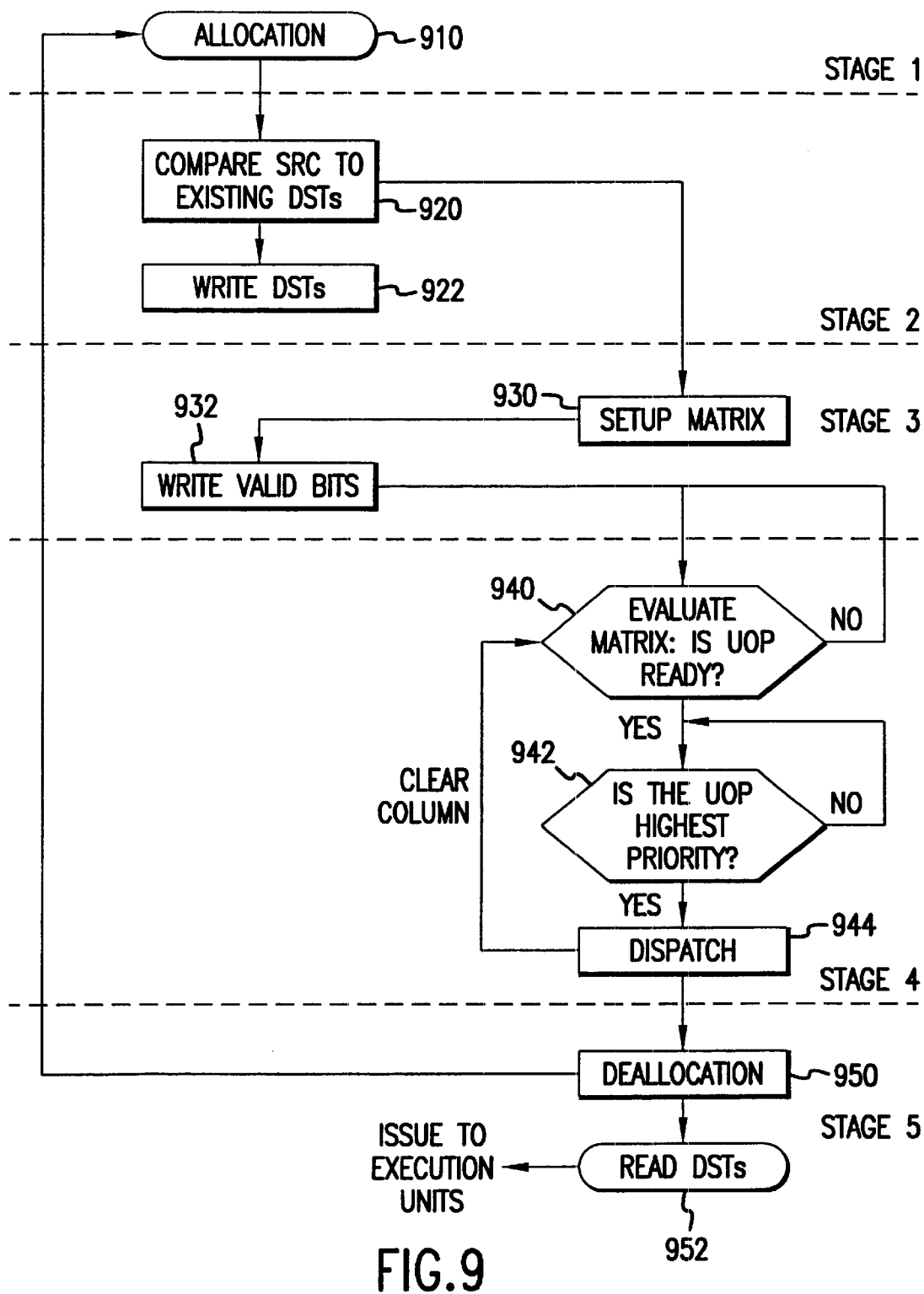
FIG. 9 is a flow diagram of a method of scheduling operations according to an embodiment of the present invention.

FIG. 9 is a flow diagram of a method of scheduling operations according to an embodiment of the present invention. Initially, it is determined which entries in the scheduler are empty, or available to store an incoming uop, as indicated at 910. This may, for example, correspond to the first stage of the pipeline shown in FIG. 8.

Referring again to FIG. 9, the sources of new uops are compared against destinations of valid entries already in the scheduling queue at 920, and the compare results, or hits, are logged for further processing. As indicated at 922, the destination, or result, registers are also written into the allocated entry. These actions may correspond to the second stage of the pipeline shown in FIG. 8. The matrix is then setup at 930, and the valid bits are written at 932, using these previously computed bits. These actions may correspond to the third stage of the pipeline shown in FIG. 8.

The matrix is evaluated as indicated at 940 by monitoring dependency bits in the dependency matrix each cycle. If all bits in a uop's row are not clear, the evaluation continues. If all bits in a row are clear, the uop is ready to be dispatched and prioritization is performed at 942. The uop is dispatched at 944 and corresponding columns in the dependency matrix are cleared. This in turn may allow other uops to dispatch. These actions comprise a scheduling loop according to an embodiment of the present invention, and may correspond to the fourth stage of the pipeline shown in FIG. 8. Next, the uop is deallocated at 950 and the valid bit is reset, allowing the entry to be re-used. At 952, the dispatched uop's information is read out for issue to the execution unit. This may correspond to the fifth stage of the pipeline shown in FIG. 8.

A further embodiment of this invention is directed at an enhanced matrix scheduler that schedules uops completely in-order. This feature is helpful when testing and debugging a system. Preferably, this feature may be enabled and disabled as desired. According to this embodiment, whenever a uop enters the scheduling queue, its dependency matrix is updated to reflect that the new uop is dependent on every other valid entry in the scheduling queue. FIGS. 10A–10B illustrate how uops run through a scheduler having a dependency matrix 1000 according to this embodiment. FIGS. 10A–10B show scheduling queue 1000 and dependency matrix 1011, which are similar to the scheduling queue and dependency matrix disclosed in FIGS. 6A–6C. The scheduling queue 1000 shown in FIGS. 10A–10B has eight positions, labeled from "0" to "7," but any number of positions can be used. Each entry in scheduling queue 1000 contains a validity indication and information about the uop. The information about the uop may include any information about the uop, such as the uop's destination, and this information may be contained in several fields. For illustrative purposes, each entry in scheduling queue 1000 is labeled with the order of the uop in the instruction stream. For example, the entry in queue position 2 in FIG. 10A was the first uop in the instruction stream, and the entry in queue position 5 was the second uop in the instruction stream.

At time T=0 (FIG. 10A) the scheduling queue 1000 has four entries with a validity bit set to "V." Each column in the dependency matrix 1011 is associated with a dependency on a position in the scheduling queue 1000. Thus, no column of row 2 in dependency matrix 1011 has a "D" because in this embodiment the first uop will not be dependent on any other uop. The second uop, which was placed in entry 5, will be dependent upon the first uop because each uop is dependent upon every prior uop that has not yet been dispatched. The second column in row 5 therefore has a "D". Similarly, the third uop is in entry 4, and columns 2 and 5 of row 4 in dependency matrix 1011 contain a "D". The fourth uop is in entry 7, and columns 2, 4, and 5 of row 4 in dependency matrix 1011 contain a "D". As before, because a uop cannot depend on itself, each box along the diagonal of the dependency matrix 1011 is marked with an "x."

FIG. 10B shows time T=1. The first uop has been dispatched and entry 2 of scheduling queue 1000 is now empty. Column 2 in the dependency matrix 1011 associated with queue position 2 has also been cleared and the "D" at rows 4, 5 and 7 have been removed. This is because once the first uop has been dispatched, dependency matrix 1011 is updated to reflect that the remaining entries are no longer dependent upon the first uop. FIG. 10B also shows that the fifth uop has been placed in queue position 0 of scheduling queue 1000. Because the fifth uop will be dependent on all the other uop's in the queue that have not been dispatched (i.e., the second, third and fourth uop's), columns 4, 5 and 7 of row 0 in dependency matrix 1011 contain a "D".

Some processors have the ability to have two different programs running at the same time on two different threads. In general, because threads don't use the results of another thread directly, there are no consequences if instructions in one thread can be executed out of order with respect to instructions in the other thread. A further embodiment, shown in FIGS. 11A–11B, is directed at an enhanced matrix scheduler that schedules uops completely in-order within each thread. In this embodiment, instructions in different threads may be executed out of order with respect to one another. FIGS. 11A–11B show scheduling queue 1100 and dependency matrix 1122 similar to the scheduling queue 1000 and dependency matrix 1100 disclosed in FIGS. 10A–10B. Scheduling queue 1100 of FIGS. 11A–11B has a thread column not present in scheduling queue 1000 of FIGS. 10A–10B. A "0" is placed in the thread column for an entry if the uop in that entry is in thread 0. A "1" is placed in the thread field if the entry is in thread 1. Although FIGS. 11A–11B shown only two threads, any number of threads may be used.

FIGS. 11A–11B both show first, second, third, fourth, and fifth uops in queue entries 2, 5, 4, 7 and 0 respectively. The first, third and fourth uops are in thread 0, so a "0" is placed in the thread column for entries 2, 4 and 7. The second and fifth uops are in thread 1, so a "1" is placed in the thread column for entries 5 and 0.

FIG. 11A shows T=0. When an entry is placed in scheduling queue 1100, the corresponding row in dependency matrix 1122 is updated to show that the entry is dependent upon all other entries in the queue that are in the same thread. Thus, there is no "D" in row 2 in dependency 1100 because the first uop is not dependent upon any other uops. Because the second uop is the first uop in thread 1, there is no "D" in row 5 of dependency matrix 1122. Because the first uop is before the third and fourth uops in thread 0, column 2 of rows 4 and 7 in dependency matrix 1122 contains a "D". In addition, column 4 in row 5 of dependency matrix 1122 has a "D" because the fourth uop is after the third uop in thread 0. Finally, because the second uop is before the fifth uop in thread 1, column 5 of row 1 in dependency matrix 1122 contains a "D".

FIG. 11B shows T=1. The first and second uops have been dispatched, so rows 2 and 5 of scheduling queue 1100 and dependency matrix 1122 have been cleared. The third uop is now the first uop in thread 0, and column 2 of row 4 in dependency matrix 1122 has been cleared to reflect that the third uop is no longer dependent on the uop in the row 2. The fourth uop is no longer dependent on the first uop but is still dependent upon the third uop, so row 7 of dependency matrix 1122 has a "D" only in column 4. The fifth uop is now the first uop in thread 1, and column 5 of row 1 in dependency matrix 1122 has been cleared to reflect that the fifth uop is no longer dependent on the uop in entry 5. A sixth uop has been placed in entry 3. Because the sixth uop is in thread 1, column 0 of row 3 in dependency matrix 1122 is marked with a "D" to reflect that the sixth uop is dependent upon the uop in entry 0 (the fifth uop).

In addition to enforcing source dependencies as discussed above, it is also be helpful to be able to enforce other inter-uop dependencies. Enforcement of such dependencies may be helpful, for example, when testing and debugging a processor. A further embodiment of the present invention is directed to a matrix scheduler that schedules uops so that a jump or branch type uop never executes before a prior jump or branch uop. The designations "jump uop" and "branch uop" may be used interchangeably, and will be referred to herein as a "jump uop." Scheduling uops so that a jump uop never executes before a prior jump is important, for example, if another unit downstream, such as a Checker Retirement Unit (CRU), requires that jump uops be received in-order. If this feature is enabled and disabled as desired, it is also be helpful when testing and debugging a system.

As shown in FIGS. 12A–12C, this embodiment includes an out-of-order scheduling queue 1200 and a dependency matrix 1222. The scheduling queue 1100 shown in FIGS. 12A–12C has eight positions, labeled from "0" to "7," but any number of positions can be used. Each position in the scheduling queue 1200 contains a validity indication and information about the uop, including the uop's destination. The scheduling queue 1200 has five entries where the validity bit is set to "D." Thus, queue position 0 is empty and queue position 1 contains an entry that has register 11 as the destination. According to this embodiment, the scheduling queue 1200 also includes an indication of whether or not the uop is a jump type instruction. Only the entry in queue position 3 is such an instruction.

As before, each row in the dependency matrix 1222 corresponds with a position in the scheduling queue 1200 and each column is associated with a dependency on a position in the scheduling queue 1200. Because a uop cannot depend on itself, each box along the diagonal of the dependency matrix 1222 is marked with an "x." As can be seen by looking at the dependency matrix 1222, the uop in queue position 1 depends on the uop in queue position 7. For example, the operation in queue position 1 may be the child of the operation in queue position 7. Because the entry in queue position 7 does not depend on any other entry, that is there is no "D" in row 7, the entry in this position is ready to be dispatched by the scheduler. When the uop is dispatched, its children no longer need to wait for register 21. Therefore, column 7 in the matrix can be cleared.

FIG. 12B shows T=1, after the uop in queue position 7 has been dispatched and a new jump uop has been placed in the scheduling queue 1200. The scheduling queue 1200 and matrix 1222 shown in FIGS. 12A and 12B use, for illustration purposes, a superscalar processor that can process two uops simultaneously. The double line indicates that the first four positions are reserved for one channel and the last four position are reserved for the second channel. However, dependency is still enforced across both schedulers. The new jump uop is placed into queue position 0, although it may be instead placed for example in queue position 5 if desired.

When a uop enters the scheduler, a dependency tree is created in the form of the dependency matrix 1222. In addition to the child-parent dependency described above, this embodiment determines if the uop entering the scheduler is a jump. If so, the jump indicator associated with that position in the scheduling queue 1222 is set. It is also determined if any other jump uops are already in the scheduler. If so, the new uop is made "dependent" on the prior jump instruction. For example, when the first jump uop shown in FIG. 12B is placed in the queue 1200, it will be seen that another jump uop is already in the scheduler, i.e. the one in position 3. Therefore, the cell in the third column of the first row will be set to "D."

FIG. 12C shows T=4, after the jump uops in entry 0 and entry 3 have been dispatched and after a new jump uop has been placed into queue position 6. When the new jump uop is placed in the queue 1200, it will be seen that no other jump uop is in the scheduler. Thus, the new jump uop is not dependent on any other jump uops and row 6 of dependency matrix 1222 does not contain a "D".

In a further embodiment, jump uops may be made dependent only upon other jump uops in the same thread. According to this embodiment, the scheduling queue 1200 contains a thread column (not shown) like that in scheduling queue 1100 of FIGS. 11A–11B. When a jump uop is placed into the scheduling queue, the dependency matrix is updated to reflect that the new jump uop is dependent open any other jump uops that are in the same thread. That is, the new jump uop will not be made dependent upon other jump uops in the scheduling queue if those other jump uops are not in the same thread.

FIGS. 13A–13C shows a further embodiment of the enhanced matrix scheduler, which is directed to an enhanced matrix scheduler that schedules uops so that a memory load uop never executes before a prior memory store uop. Preferably, this feature is enabled and disabled as desired. This is important because in some processors memory store uops can be executed out-of-order with respect to each other, memory load uops can be executed out-of-order with respect to each other, and memory store uops can be executed before prior memory load uops. However, in such processors problems are caused if a memory load uop executes before a prior memory store uop, since it is not known if the memory store uop will impact the result of the memory load uop. These problems may be avoided if all memory uops were executed in-order, similar to the jump uop embodiment described above. However, this is unnecessarily limit system performance.

As shown in FIG. 13A, this embodiment includes an out-of-order scheduling queue 1330 and a dependency matrix 1305 similar to those described above. According to this embodiment, the scheduling queue 1330 also includes an indication of whether or not the uop is a memory store instruction. The entries in queue positions 3 and 5 are such instructions.

FIG. 13B shows T=1, after the uop at entry 5 has been dispatched and newly issued memory load and store uops are placed in the scheduling queue 1330. The load uop is being placed into queue position 1 and the store uop is being placed into queue position 6. When a uop enters the scheduler, this embodiment determines if the uop entering the scheduler is a memory store uop (in addition to the normal child-parent dependency determination). If so, the store indicator associated with that position in the scheduling queue 1330 is set. If the uop entering the scheduler is a memory load uop, it is also determined if any other memory store uops are already in the scheduler. If so, the new memory load uop is made "dependent" on the prior memory store instruction. For example, when the memory load uop shown as entry 1 in FIG. 13B is placed in the queue 1330, it will be seen that a memory store uop is already in the scheduler, i.e. the one in position 3. Therefore, the cell in the third column of the first row will be set to "D." In addition, because the new uop at entry 6 is a store uop, the cell in the sixth column of the first row will be set to "D".

FIG. 13C shows T=3, after the store uops in entries 3 and 6 have been dispatched and after a new load uop has been placed into queue position 0. When the new load uop is placed in the queue 1330, it will be seen that no other store uop is in the scheduler. Thus, the new load uop is not dependent on any other store uops and row 0 of dependency matrix 1305 does not contain a "D".

In a further embodiment, load uops may be made dependent only upon store uops in the same thread. According to this embodiment, the scheduling queue 1330 contains a thread column (not shown) like that in scheduling queue 1100 of FIGS. 11A–11B. When a load uop is placed into the scheduling queue, the dependency matrix is updated to reflect that the new load uop is dependent open any store uops that are in the same thread. That is, the new load uop will not be made dependent upon store uops in the scheduling queue if those store uops are not in the same thread.

Although various embodiments are specifically illustrated and described herein, it will be appreciated that modifications and variations of the present invention are covered by the above teachings and within the purview of the appended claims without departing from the spirit and intended scope of the invention. For example, although a scheduler for uops was used to illustrate an embodiment of the present invention, it will be appreciated that schedulers for other types of operations will also fall within the scope of the invention. It should similarly be appreciated that the particular architectures described above are illustrative only. Other matrix scheduler architectures will also fall within the scope of the present invention. In addition, although the invention has been described with reference to a specific processor architecture, it is useful in any number of alternative architectures, and with a wide variety of microarchitectures within each. Finally, although software or hardware are described to control certain functions, such functions can be performed using either software, hardware or a combination of software and hardware, as is well known in the art. As is also known, software may be stored on a medium, such as, for example, a hard or floppy disk or a Compact Disk Read Only Memory (CD-ROM), in the form of instructions adapted to be executed by a processor. The instructions may be stored on the medium in a compressed and/or encrypted format. As used herein, the phrase "adapted to be executed by a processor" is meant to encompass instructions stored in a compressed and/or encrypted format, as well as instructions that have to be compiled or installed by an installer before being executed by the processor.

What is claimed is:

1. A method of scheduling an operation in a processor, comprising:

receiving a jump operation to be scheduled;

determining if there were any previous jump operations that have not been dispatched for execution;

storing the results of said determination; and scheduling the received jump operation for dispatch after all previous jump operations have been dispatched for execution.

2. The method of claim 1, wherein the method further comprises determining whether all previous jump operations have been dispatched for execution based at least in part on a dependency matrix.

3. The method of claim 2, wherein the method comprises scheduling the received jump operation for dispatch without regard to whether all previous jump operations have been dispatched for execution if in-order execution has been enabled.

4. The method of claim 2, wherein the dependency matrix has rows and columns, each row corresponding to an entry in the scheduling queue and each column corresponding to a dependency on an entry in the scheduling queue, and wherein said storing the results of said determination in a dependency matrix comprises storing an indication of dependency in the row associated with the load operation and the column associated with a parent operation.

5. A method of scheduling an operation in a processor, comprising:
receiving a load operation to be scheduled;
determining based at least in part on a dependency matrix if there were any previous store operations that have not been dispatched for execution;
storing the results of said determination; and
scheduling the received load operation for dispatch after all previous store operations have been dispatched for execution.

6. The method of claim 5, wherein the method comprises scheduling the received load operation for dispatch without regard to whether all previous load operations have been dispatched for execution if in-order execution has been enabled.

7. The method of claim 5, wherein the dependency matrix has rows and columns, each row corresponding to an entry in the scheduling queue and each column corresponding to a dependency on an entry in the scheduling queue, and wherein said storing the results of said determination in a dependency matrix comprises storing an indication of dependency in the row associated with the load operation and the column associated with a parent operation.

8. A method of scheduling an operation in a processor, comprising:
receiving a first operation to be scheduled;
placing an entry corresponding to the first operation in a scheduling queue;
if in-order execution is not enabled:
 determining if the first operation depends upon any operations for which there is an entry in the scheduling queue;
 storing the result of said determination in a dependency matrix; and
 scheduling the first operation entry for dispatch based on the information stored in the dependency matrix; and
if in-order execution is enabled, scheduling the first operation for dispatch based on the order that the entry corresponding to the first operation was placed in the scheduling queue relative to any other entries in the scheduling queue.

9. The method of claim 8, wherein:
the first operation is in a thread of operations;
said placing an entry further comprises recording in the scheduling queue which thread that the first operation is in; and
said first operation is determined to depend upon another operation only if the other operation is in the same thread as the first operation.

10. The method of claim 8, wherein:
the dependency matrix has rows and columns, each row corresponding to an entry in the scheduling queue and each column corresponding to a dependency on an entry in the scheduling queue;
if the first operation depends upon a parent operation, said storing comprises storing an indication of dependency in the row associated with the first operation and the column associated with the parent operation; and
said scheduling the first operation for dispatch based on the information stored in the dependency matrix comprises scheduling an entry in the scheduling queue for dispatch if the row associated with the first operation does not indicate a dependency on a parent operation.

11. The method of claim 10, further comprising:
removing a dispatched entry from the scheduling queue when the operation associated with the dispatched entry has been performed; and
clearing the column in the dependency matrix associated with the dispatched operation.

12. The method of claim 8, wherein if in-order execution is enabled then placing an entry in the scheduling queue further comprises updating the scheduling queue to indicate that the entry being placed in the scheduling queue is dependent on every other valid entry in the scheduling queue.

13. A method of scheduling an operation in a processor, comprising:
receiving a first operation to be scheduled;
placing an entry corresponding to the first operation in a scheduling queue, wherein said scheduling queue contains information identifying a thread that the first operation is in, and wherein said placing an entry further comprises recording in the scheduling queue which thread that the first operation is in;
determining if another entry in the scheduling queue corresponds to the same type of operation and is in the same thread as the received first operation;
storing the result of said determination in a dependency matrix; and
scheduling an entry in the scheduling queue based on the information stored in the dependency matrix.

14. The method of claim 13, wherein said determining is performed without considering if the scheduling queue contains another jump operation when execution of jump operations in-order is not enabled.

15. The method of claim 13, wherein:
the dependency matrix has rows and columns, each row corresponding to an entry in the scheduling queue and each column corresponding to a dependency on an entry in the scheduling queue;
if the first operation depends upon a parent operation, said storing comprises storing an indication of dependency in the row associated with the first operation and the column associated with a parent operation; and
said scheduling comprises scheduling an entry in the scheduling queue for dispatch if the row associated with the entry contains no element indicating dependency.

16. The method of claim 15, further comprising:
removing a dispatched entry from the scheduling queue when the operation associated with the dispatched entry has been performed; and
clearing the column in the dependency matrix associated with the dispatched operation.

17. The method of claim 13, wherein the first operation is a load type operation, and wherein another operation corresponds to the first operation if the other operation is a load operation.

18. The method of claim 13, wherein the first operation is a jump type operation.

19. A method of scheduling an operation in a processor, comprising:
receiving a first operation to be scheduled, wherein said first operation is a store operation;
placing an entry corresponding to the first operation in a scheduling queue;
determining if another entry in the scheduling queue corresponds to the same type of operation as the received first operation;

storing the result of said comparison in a dependency matrix, wherein the dependency matrix has rows and columns, each row corresponding to an entry in the scheduling queue and each element in each column corresponding to a dependency on an entry in the scheduling queue, and wherein said storing comprises storing an indication of dependency in the row associated with the first operation and the column associated with a parent operation; and scheduling an entry in the scheduling queue based on the information stored in the dependency matrix, said scheduling comprises scheduling an entry for dispatch if the row associated with the entry contains no element indicating dependency.

20. The method of claim 19, wherein said determining is performed without considering if the scheduling queue contains another load operation when execution of store operations in-order is not enabled.

21. The method of claim 19, wherein:

said scheduling queue contains information identifying a thread that an operation is in;

said placing an entry further comprises recording in the scheduling queue which thread that said first operation is in; and said determining further comprises determining if another scheduling queue entry in the same thread as the first operation corresponds to a previous operation in the same thread.

22. The method of claim 19, further comprising:

removing a dispatched entry from the scheduling queue when the operation associated with the dispatched entry has been performed; and clearing the column in the dependency matrix associated with the dispatched operation.

23. The method of claim 19, wherein the first operation is a load type operation, and wherein another operation corresponds to the first operation if the other operation is a load operation.

24. A matrix scheduler, comprising:

a memory to store a scheduling queue having a number of entries for holding operations and to store a dependency matrix having rows, each row corresponding to an entry in said scheduling queue, and columns, each column corresponding to a dependency on an entry in said scheduling queue;

a queueing unit to place an operation into the scheduling queue, said queueing unit to record in the dependency matrix row associated with said operation that said operation is dependent upon all other entries in the queue that are the same type of operation;

a scheduling unit to select an entry in said scheduling queue when the row in said dependency matrix associated with that entry does not contain an indication of dependency on another entry in said scheduling queue.

25. The matrix scheduler of claim 24, wherein said queueing unit is to record whether in-order execution is enabled, and wherein said queueing unit does not record that said operation is dependent upon all other entries in the queue when in-order execution is not enabled.

26. The matrix scheduler of claim 24, wherein:

said scheduling queue contains information identifying which thread said operation is in;

said queueing unit is to further record which thread said operation is in; and said queueing unit is to record in the dependency matrix row associated with said operation that said operation is dependent upon another operation only if said another entry is in the same thread.

27. A matrix scheduler, comprising:

a memory to store a scheduling queue having a number of entries for holding operations and to store a dependency matrix having rows, each row corresponding to an entry in said scheduling queue, and columns, each column corresponding to a dependency on an entry in said scheduling queue;

a queueing unit to place a jump operation into the scheduling queue, said queueing unit to record in the dependency matrix row associated with said jump operation that said jump operation is dependent upon all other entries in the queue that correspond to jump operations;

a scheduling unit to select an entry in said scheduling queue when the row in said dependency matrix associated with that entry does not contain an indication of dependency on another entry in said scheduling queue.

28. The matrix scheduler of claim 27, wherein said queueing unit is to record whether in-order jump execution is enabled, and wherein said queueing unit does not record that said jump operation is dependent on all other entries that correspond to jump operations when in-order jump execution is not enabled.

29. The matrix scheduler of claim 28, wherein:

said scheduling queue contains information identifying which thread operations are in;

said queueing unit is to further record which thread said jump operation is in; and said queueing unit is to further record in the dependency matrix row associated with said jump operation that said jump operation is dependent upon another jump operation only if said another jump operation is in the same thread.

30. A matrix scheduler, comprising:

a memory to store a scheduling queue having a number of entries for holding operations and to store a dependency matrix having rows, each row corresponding to an entry in said scheduling queue, and columns, each column corresponding to a dependency on an entry in said scheduling queue;

a queueing unit to place a store operation into the scheduling queue, said queueing unit to record in the dependency matrix row associated with said store operation that said store operation is dependent upon all entries in the queue that correspond to load operations;

a scheduling unit to select an entry in said scheduling queue when the row in said dependency matrix associated with that entry does not contain an indication of dependency on another entry in said scheduling queue.

31. The matrix scheduler of claim 30, wherein said queueing unit is to record whether in-order load execution is enabled, and wherein said queueing unit does not record that said store operation is dependent upon all entries corresponding to load operations when in-order load execution is not enabled.

32. The matrix scheduler of claim 30, wherein:

said scheduling queue contains information identifying which thread operations are in;

said queueing unit is to further record which thread said store operation is in; and said queueing unit is to further record in the dependency matrix row associated with said store operation that said store operation is dependent upon a load operation only if the load operation is in the same thread as the store operation.

33. An article of manufacture comprising a computer-readable medium having stored thereon instructions adapted to be executed by a processor, the instructions which, when executed, cause the processor to schedule an operation by:

receiving a jump operation to be scheduled, wherein the jump operation is part of a thread;

determining if previous jump operations in the same thread as the received jump operation have not been dispatched for execution;

storing the results of said determination in a dependency matrix; and based on information stored in the dependency matrix, scheduling the received jump operation for dispatch after all previous jump operations in the same thread as the received jump operation have been dispatched for execution.

34. The article of manufacture of claim 33, wherein the dependency matrix has rows and columns, each row corresponding to an entry in a scheduling queue and each column corresponding to a dependency on an entry in the scheduling queue, and wherein said storing the results of said determination in a dependency matrix comprises storing an indication of dependency in the row associated with the jump operation and the column associated with a parent operation.

35. An article of manufacture comprising a computer-readable medium having stored thereon instructions adapted to be executed by a processor, the instructions which, when executed, cause the processor to schedule an operation by:

receiving a load operation to be scheduled, wherein the load operation is part of a thread;

determining if previous store operations in the same thread as the received load operation have not been dispatched for execution;

storing the results of said determination in a dependency matrix; and based on information stored in the dependency matrix, scheduling the received load operation for dispatch after all previous store operations in the same thread as the received load operation have been dispatched for execution.

36. The article of manufacture of claim 35, wherein the dependency matrix has rows and columns, each row corresponding to an entry in the scheduling queue and each column corresponding to a dependency on an entry in the scheduling queue, and wherein said storing the results of said determination in a dependency matrix comprises storing an indication of dependency in the row associated with the load operation and the column associated with a parent operation.

* * * * *